US012705634B2

(12) United States Patent
Ershov et al.

(10) Patent No.: US 12,705,634 B2
(45) Date of Patent: Aug. 11, 2026

(54) SYSTEM, METHOD, AND COMPUTER PROGRAM PRODUCT FOR PREDICTING CONSUMER BEHAVIOR BASED ON DEMOGRAPHICS AND NEW PRODUCT FEATURES USING MACHINE LEARNING MODELS

(71) Applicant: Visa International Service Association, San Francisco, CA (US)

(72) Inventors: Egor Ershov, Arlington, VA (US); John Alexander Taylor, Washington, DC (US); Yuan Fang, Santa Clara, CA (US); Hank Dea Wu, New York, NY (US); Natalia Skorokhodova, Camarillo, CA (US); Dennis Becker, Arlington, VA (US)

(73) Assignee: Visa International Service Association, San Francisco, CA (US)

( * ) Notice: Subject to any disclaimer, the term of this patent is extended or adjusted under 35 U.S.C. 154(b) by 37 days.

(21) Appl. No.: 18/632,906

(22) Filed: Apr. 11, 2024

(65) Prior Publication Data

US 2025/0322417 A1 Oct. 16, 2025

(51) Int. Cl.

*G06Q 30/0202* (2023.01)
*G06Q 30/0204* (2023.01)
*G06Q 30/0211* (2023.01)

(52) U.S. Cl.

CPC ..... *G06Q 30/0202* (2013.01); *G06Q 30/0204* (2013.01); *G06Q 30/0211* (2013.01)

(58) Field of Classification Search

None

See application file for complete search history.

(56) References Cited

U.S. PATENT DOCUMENTS 11,315,179 B1 * 4/2022 Rehder ............... G06F 18/2113
2011/0202386 A1 * 8/2011 Hamlisch ......... G06Q 10/06311 705/7.31

(Continued)

OTHER PUBLICATIONS

Adekunle, "Improving Customer Retention Through Machine Learning: A Predictive Approach to Churn Prevention and Engagement Strategies," 2023, International Journal of Scientific Research in Computer Science, Engineering and Information Technology, 9.4, pp. 507-523 (Year: 2023).*

*Primary Examiner* — Ivan R Goldberg

(74) *Attorney, Agent, or Firm* — The Webb Law Firm

(57) ABSTRACT

Systems, methods, and computer program products are provided for predicting consumer behavior based on demographics and new product features using machine learning models. An example method includes receiving spending behavior data, payment device feature data, and transaction data associated with existing payment devices and proposed spending behavior data and proposed payment device feature data associated with a proposed payment device. A machine learning model (MLM) is trained to predict a transaction metric associated with the transaction data based on the spending behavior data and the payment device feature data for the existing payment devices. The trained MLM predicts a predicted transaction metric based on the proposed spending behavior data and the proposed payment device feature data associated with the proposed payment device. A communication is transmitted based on the predicted transaction metric.

15 Claims, 7 Drawing Sheets

(56) References Cited

U.S. PATENT DOCUMENTS

| | | | | |
|---|---|---|---|---|
| 2015/0161645 | A1* | 6/2015 | Unser | G06Q 30/0226 705/14.27 |
| 2015/0170175 | A1* | 6/2015 | Zhang | H04M 15/851 705/7.33 |
| 2019/0057400 | A1* | 2/2019 | Nair | G06Q 20/20 |
| 2021/0142352 | A1* | 5/2021 | Woodrick | G06Q 20/405 |
| 2021/0256521 | A1* | 8/2021 | Ding | G06Q 30/0277 |

* cited by examiner

300
Existing Payment Device Feature Data
306
Comparison Payment Device Feature Data
308
Training Dataset
304
Machine Learning Model System
302

500

SYSTEM, METHOD, AND COMPUTER PROGRAM PRODUCT FOR PREDICTING CONSUMER BEHAVIOR BASED ON DEMOGRAPHICS AND NEW PRODUCT FEATURES USING MACHINE LEARNING MODELS

BACKGROUND

1. Technical Field

This disclosure relates generally to predicting behavior using machine learning models and, in non-limiting embodiments or aspects, to systems, methods, and computer program products for predicting consumer behavior based on demographics and new product features using machine learning models.

2. Technical Considerations

When designing and/or preparing to launch a new product, a provider of that product may desire to understand how consumers will behave with respect to that product or features thereof. For example, such a provider may decide whether to include or exclude certain features in a product or even whether to launch or not launch the product based on how the product or the features thereof would be used by consumers.

However, it can be difficult to predict consumer behavior with respect to a new product. For example, it may be difficult for an issuer to predict spending behavior of consumers with respect to a proposed new payment device. Simply observing similar existing products (e.g., existing payment device products on the market) may fail to account for differences in demographics and/or differences in features of the existing products with respect to the new products. As such, the accuracy of any predictions based on such past observations may suffer. Moreover, a new product may include multiple features (e.g., multiple new features, multiple features of interest, and/or the like), and it may be difficult to predict which feature(s) are impacting consumer behavior and/or how different feature(s) are impacting consumer behavior.

SUMMARY

Accordingly, provided are improved systems, methods, and computer program products for predicting consumer behavior based on demographics and new product features using machine learning models.

According to non-limiting embodiments or aspects, provided is a system for predicting consumer behavior based on demographics and new product features using machine learning models. In some non-limiting embodiments or aspects, the system may include at least one processor. In some non-limiting embodiments or aspects, the at least one processor may be configured to receive spending behavior data, payment device feature data, and transaction data associated with each existing payment device of a plurality of existing payment devices. In some non-limiting embodiments or aspects, the spending behavior data may be associated with a plurality of spending behavior-related features of a respective group of users for each respective existing payment device of the plurality of existing payment devices. In some non-limiting embodiments or aspects, the payment device feature data may be associated with a plurality of payment device features for each existing payment device of the plurality of existing payment devices. In some non-limiting embodiments or aspects, the transaction data may be associated with at least one transaction related feature of the respective group of users for each respective existing payment device of the plurality of existing payment devices. In some non-limiting embodiments or aspects, the at least one processor may be configured to receive proposed spending behavior data and proposed payment device feature data associated with at least one proposed payment device. In some non-limiting embodiments or aspects, the proposed spending behavior data associated with a plurality of spending behavior-related features of a proposed group of users for the at least one proposed payment device, the proposed payment device feature data may be associated with a plurality of payment device features for the at least one proposed payment device. In some non-limiting embodiments or aspects, the at least one processor may be configured to train at least one machine learning model to predict at least one transaction metric associated with the transaction data based on the spending behavior data and the payment device feature data associated with each existing payment device of the plurality of existing payment devices. In some non-limiting embodiments or aspects, the at least one processor may be configured to predict at least one predicted transaction metric based on the proposed spending behavior data and the proposed payment device feature data associated with the at least one proposed payment device using the at least one machine learning model. In some non-limiting embodiments or aspects, the at least one processor may be configured to transmit at least one communication based on the at least one predicted transaction metric.

In some non-limiting embodiments or aspects, the at least one processor may be configured to determine an average value of the at least one transaction related feature. In some non-limiting embodiments or aspects, the at least one predicted transaction metric may include a percentage change of the at least one transaction related feature relative to the average value of the at least one transaction related feature.

In some non-limiting embodiments or aspects, the plurality of existing payment devices may include a comparison payment device.

In some non-limiting embodiments or aspects, the at least one predicted transaction metric may be a percentage change of the at least one transaction related feature relative to an actual value of the at least one transaction related feature for the comparison payment device. In some non-limiting embodiments or aspects, the proposed spending behavior data may include the spending behavior data associated with the comparison payment device.

In some non-limiting embodiments or aspects, the spending behavior data may include demographic data, issuer attribute data, and macroeconomic data.

In some non-limiting embodiments or aspects, the at least one processor may be further configured to match at least a subset of the plurality of payment device features of each existing payment device with at least a subset of the plurality of payment device features of the at least one proposed payment device. In some non-limiting embodiments or aspects, the plurality of existing payment devices may be selected based on the matching.

In some non-limiting embodiments or aspects, the at least one transaction metric may include a plurality of transaction metrics. In some non-limiting embodiments or aspects, the at least one machine learning model may include a plurality of machine learning models. In some non-limiting embodiments or aspects, each respective machine learning model of the plurality of machine learning models may be associated with a respective transaction metric of the plurality of transaction metrics.

In some non-limiting embodiments or aspects, the at least one processor may be further configured to determine a feature importance ranking of the plurality of payment device features. In some non-limiting embodiments or aspects, the at least one processor may be further configured to generate the at least one communication based on the feature importance ranking.

According to non-limiting embodiments or aspects, provided is a method for predicting consumer behavior based on demographics and new product features using machine learning models. In some non-limiting embodiments or aspects, the method may include receiving spending behavior data, payment device feature data, and transaction data associated with each existing payment device of a plurality of existing payment devices. In some non-limiting embodiments or aspects, the spending behavior data may be associated with a plurality of spending behavior-related features of a respective group of users for each respective existing payment device of the plurality of existing payment devices. In some non-limiting embodiments or aspects, the payment device feature data may be associated with a plurality of payment device features for each existing payment device of the plurality of existing payment devices. In some non-limiting embodiments or aspects, the transaction data may be associated with at least one transaction related feature of the respective group of users for each respective existing payment device of the plurality of existing payment devices. In some non-limiting embodiments or aspects, the method may include receiving proposed spending behavior data and proposed payment device feature data associated with at least one proposed payment device. In some non-limiting embodiments or aspects, the proposed spending behavior data may be associated with a plurality of spending behavior-related features of a proposed group of users for the at least one proposed payment device. In some non-limiting embodiments or aspects, the proposed payment device feature data may be associated with a plurality of payment device features for the at least one proposed payment device. In some non-limiting embodiments or aspects, the method may include training at least one machine learning model to predict at least one transaction metric associated with the transaction data based on the spending behavior data and the payment device feature data associated with each existing payment device of the plurality of existing payment devices. In some non-limiting embodiments or aspects, the method may include predicting at least one predicted transaction metric based on the proposed spending behavior data and the proposed payment device feature data associated with the at least one proposed payment device using the at least one machine learning model. In some non-limiting embodiments or aspects, the method may include transmitting at least one communication based on the at least one predicted transaction metric.

In some non-limiting embodiments or aspects, the method may include determining an average value of the at least one transaction related feature. In some non-limiting embodiments or aspects, the at least one predicted transaction metric may include a percentage change of the at least one transaction related feature relative to the average value of the at least one transaction related feature.

In some non-limiting embodiments or aspects, the plurality of existing payment devices may include a comparison payment device. In some non-limiting embodiments or aspects, the at least one predicted transaction metric may be a percentage change of the at least one transaction related feature relative to an actual value of the at least one transaction related feature for the comparison payment device. In some non-limiting embodiments or aspects, the proposed spending behavior data may include the spending behavior data associated with the comparison payment device.

In some non-limiting embodiments or aspects, the spending behavior data may include demographic data, issuer attribute data, and macroeconomic data.

In some non-limiting embodiments or aspects, the method may include matching at least a subset of the plurality of payment device features of each existing payment device with at least a subset of the plurality of payment device features of the at least one proposed payment device. In some non-limiting embodiments or aspects, the plurality of existing payment devices may be selected based on the matching.

In some non-limiting embodiments or aspects, the at least one transaction metric may include a plurality of transaction metrics. In some non-limiting embodiments or aspects, the at least one machine learning model may include a plurality of machine learning models. In some non-limiting embodiments or aspects, each respective machine learning model of the plurality of machine learning models may be associated with a respective transaction metric of the plurality of transaction metrics.

In some non-limiting embodiments or aspects, the method may include determining a feature importance ranking of the plurality of payment device features. In some non-limiting embodiments or aspects, the method may include generating the at least one communication based on the feature importance ranking.

According to non-limiting embodiments or aspects, provided is a computer program product for predicting consumer behavior based on demographics and new product features using machine learning models. In some non-limiting embodiments or aspects, the computer program product may include at least one non-transitory computer-readable medium including program instructions that, when executed by at least one processor, cause the at least one processor to receive spending behavior data, payment device feature data, and transaction data associated with each existing payment device of a plurality of existing payment devices. In some non-limiting embodiments or aspects, the spending behavior data may be associated with a plurality of spending behavior-related features of a respective group of users for each respective existing payment device of the plurality of existing payment devices. In some non-limiting embodiments or aspects, the payment device feature data may be associated with a plurality of payment device features for each existing payment device of the plurality of existing payment devices. In some non-limiting embodiments or aspects, the transaction data may be associated with at least one transaction related feature of the respective group of users for each respective existing payment device of the plurality of existing payment devices. In some non-limiting embodiments or aspects, the instructions, when executed by at least one processor, may cause the at least one processor to receive proposed spending behavior data and proposed payment device feature data associated with at least one proposed payment device. In some non-limiting embodiments or aspects, the proposed spending behavior data may be associated with a plurality of spending behavior-related features of a proposed group of users for the at least one proposed payment device. In some non-limiting embodiments or aspects, the proposed payment device feature data may be associated with a plurality of payment device features for the at least one proposed payment device. In some non-limiting embodiments or aspects, the instructions, when executed by at least one processor, may cause the at least one processor to train at least one machine learning model to predict at least one transaction metric associated with the transaction data based on the spending behavior data and the payment device feature data associated with each existing payment device of the plurality of existing payment devices. In some non-limiting embodiments or aspects, the instructions, when executed by at least one processor, may cause the at least one processor to predict at least one predicted transaction metric based on the proposed spending behavior data and the proposed payment device feature data associated with the at least one proposed payment device using the at least one machine learning model. In some non-limiting embodiments or aspects, the instructions, when executed by at least one processor, may cause the at least one processor to transmit at least one communication based on the at least one predicted transaction metric.

In some non-limiting embodiments or aspects, the program instructions, when executed by the at least one processor, may cause the at least one processor to determine an average value of the at least one transaction related feature. In some non-limiting embodiments or aspects, the at least one predicted transaction metric may include a percentage change of the at least one transaction related feature relative to the average value of the at least one transaction related feature.

In some non-limiting embodiments or aspects, the plurality of existing payment devices may include a comparison payment device.

In some non-limiting embodiments or aspects, the at least one predicted transaction metric may be a percentage change of the at least one transaction related feature relative to an actual value of the at least one transaction related feature for the comparison payment device. In some non-limiting embodiments or aspects, the proposed spending behavior data may include the spending behavior data associated with the comparison payment device.

In some non-limiting embodiments or aspects, the program instructions, when executed by the at least one processor, may cause the at least one processor to match at least a subset of the plurality of payment device features of each existing payment device with at least a subset of the plurality of payment device features of the at least one proposed payment device. In some non-limiting embodiments or aspects, the plurality of existing payment devices may be selected based on the matching.

In some non-limiting embodiments or aspects, the program instructions, when executed by the at least one processor, may cause the at least one processor to determine a feature importance ranking of the plurality of payment device features. In some non-limiting embodiments or aspects, the program instructions, when executed by the at least one processor, may cause the at least one processor to generate the at least one communication based on the feature importance ranking.

In some non-limiting embodiments or aspects, the spending behavior data may include demographic data, issuer attribute data, and macroeconomic data.

In some non-limiting embodiments or aspects, the at least one transaction metric may include a plurality of transaction metrics. In some non-limiting embodiments or aspects, the at least one machine learning model may include a plurality of machine learning models. In some non-limiting embodiments or aspects, each respective machine learning model of the plurality of machine learning models may be associated with a respective transaction metric of the plurality of transaction metrics.

Further non-limiting embodiments or aspects are set forth in the following numbered clauses:

Clause 1: A system comprising: at least one processor configured to: receive spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices; receive proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device; train at least one machine learning model to predict at least one transaction metric associated with the transaction data based on the spending behavior data and the payment device feature data associated with each existing payment device of the plurality of existing payment devices; predict at least one predicted transaction metric based on the proposed spending behavior data and the proposed payment device feature data associated with the at least one proposed payment device using the at least one machine learning model; and transmit at least one communication based on the at least one predicted transaction metric.

Clause 2: The system of clause 1, wherein the at least one processor is further configured to: determine an average value of the at least one transaction related feature, wherein the at least one predicted transaction metric comprises a percentage change of the at least one transaction related feature relative to the average value of the at least one transaction related feature.

Clause 3: The system of clause 1 or 2, wherein the plurality of existing payment devices comprises a comparison payment device.

Clause 4: The system of any of clauses 1-3, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

Clause 5: The system of any of clauses 1-4, wherein the spending behavior data comprises demographic data, issuer attribute data, and macroeconomic data.

Clause 6: The system of any of clauses 1-5, wherein the at least one processor is further configured to: match at least a subset of the plurality of payment device features of each existing payment device with at least a subset of the plurality of payment device features of the at least one proposed payment device, wherein the plurality of existing payment devices are selected based on the matching.

Clause 7: The system of any of clauses 1-6, wherein the at least one transaction metric comprises a plurality of transaction metrics, wherein the at least one machine learning model comprises a plurality of machine learning models, and wherein each respective machine learning model of the plurality of machine learning models is associated with a respective transaction metric of the plurality of transaction metrics.

Clause 8: The system of any of clauses 1-7, wherein the at least one processor is further configured to: determine a feature importance ranking of the plurality of payment device features; and generate the at least one communication based on the feature importance ranking.

Clause 9: A method comprising: receiving, with at least one processor, spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices; receiving, with at least one processor, proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device; training, with at least one processor, at least one machine learning model to predict at least one transaction metric associated with the transaction data based on the spending behavior data and the payment device feature data associated with each existing payment device of the plurality of existing payment devices; predicting, with at least one processor, at least one predicted transaction metric based on the proposed spending behavior data and the proposed payment device feature data associated with the at least one proposed payment device using the at least one machine learning model; and transmitting, with at least one processor, at least one communication based on the at least one predicted transaction metric.

Clause 10: The method of clause 9, further comprising: determining, with at least one processor, an average value of the at least one transaction related feature, wherein the at least one predicted transaction metric comprises a percentage change of the at least one transaction related feature relative to the average value of the at least one transaction related feature.

Clause 11: The method of clause 9 or 10, wherein the plurality of existing payment devices comprises a comparison payment device, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

Clause 12: The method of any of clauses 9-11, wherein the spending behavior data comprises demographic data, issuer attribute data, and macroeconomic data.

Clause 13: The method of any of clauses 9-12, further comprising: matching, with at least one processor, at least a subset of the plurality of payment device features of each existing payment device with at least a subset of the plurality of payment device features of the at least one proposed payment device, wherein the plurality of existing payment devices are selected based on the matching.

Clause 14: The method of any of clauses 9-13, wherein the at least one transaction metric comprises a plurality of transaction metrics, wherein the at least one machine learning model comprises a plurality of machine learning models, and wherein each respective machine learning model of the plurality of machine learning models is associated with a respective transaction metric of the plurality of transaction metrics.

Clause 15: The method of any of clauses 9-14, further comprising: determining, with at least one processor, a feature importance ranking of the plurality of payment device features; and generating, with at least one processor, the at least one communication based on the feature importance ranking.

Clause 16: A computer program product, comprising at least one non-transitory computer-readable medium including program instructions that, when executed by at least one processor, cause the at least one processor to: receive spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices; receive proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device; train at least one machine learning model to predict at least one transaction metric associated with the transaction data based on the spending behavior data and the payment device feature data associated with each existing payment device of the plurality of existing payment devices; predict at least one predicted transaction metric based on the proposed spending behavior data and the proposed payment device feature data associated with the at least one proposed payment device using the at least one machine learning model; and transmit at least one communication based on the at least one predicted transaction metric.

Clause 17: The computer program product of clause 16, wherein the program instructions, when executed by the at least one processor, further cause the at least one processor to: determine an average value of the at least one transaction related feature, wherein the at least one predicted transaction metric comprises a percentage change of the at least one transaction related feature relative to the average value of the at least one transaction related feature.

Clause 18: The computer program product of clause 16 or 17, wherein the plurality of existing payment devices comprises a comparison payment device.

Clause 19: The computer program product of any of clauses 16-18, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

Clause 20: The computer program product of any of clauses 16-19, wherein the program instructions, when executed by the at least one processor, further cause the at least one processor to: match at least a subset of the plurality of payment device features of each existing payment device with at least a subset of the plurality of payment device features of the at least one proposed payment device, wherein the plurality of existing payment devices are selected based on the matching.

Clause 21: The computer program product of any of clauses 16-20, wherein the program instructions, when executed by the at least one processor, further cause the at least one processor to: determine a feature importance ranking of the plurality of payment device features; and generate the at least one communication based on the feature importance ranking.

Clause 22: The computer program product of any of clauses 16-21, wherein the spending behavior data comprises demographic data, issuer attribute data, and macroeconomic data.

Clause 23: The computer program product of any of clauses 16-22, wherein the at least one transaction metric comprises a plurality of transaction metrics, wherein the at least one machine learning model comprises a plurality of machine learning models, and wherein each respective machine learning model of the plurality of machine learning models is associated with a respective transaction metric of the plurality of transaction metrics.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
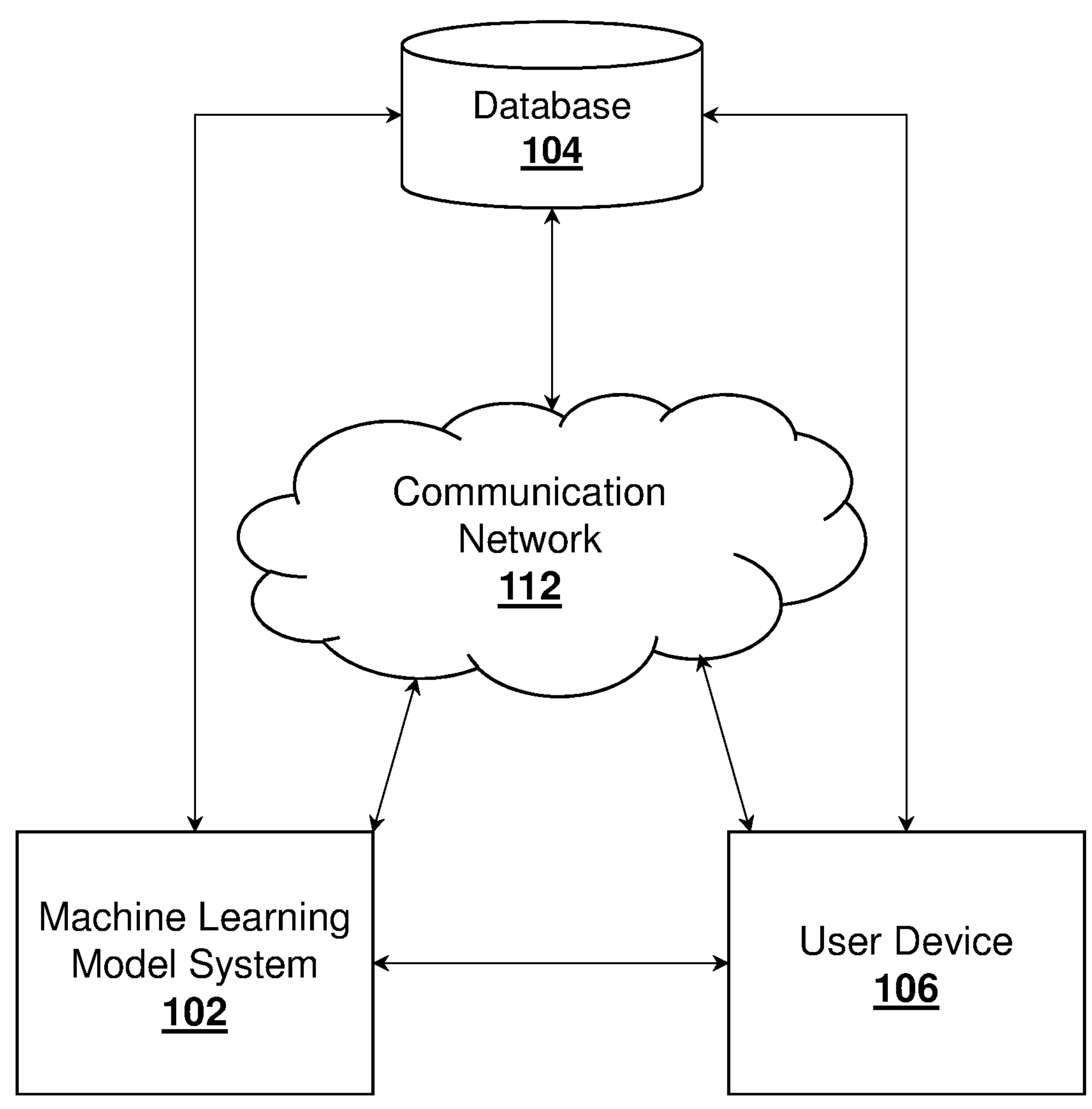
FIG. 1 is a schematic diagram of a system for predicting consumer behavior based on demographics and new product features using machine learning models, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway. As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for predicting consumer behavior based on demographics and new product features using machine learning models. For example, non-limiting embodiments or aspects of the disclosed subject matter provide receiving spending behavior data, payment device feature data, and transaction data associated with each existing payment device of a plurality of existing payment devices. The spending behavior data may be associated with a plurality of spending behavior-related features of a respective group of users for each respective existing payment device of the plurality of payment devices. In some non-limiting embodiments or aspects, the spending behavior data may include demographic data, issuer attribute data, and macroeconomic data. The issuer attribute data may include a footprint of the issuer (e.g., geographic location of the issuer). The macroeconomic data may include data associated with one or more macroeconomic conditions. The macroeconomic data may include data that identifies a location of a cardholder's home and/or an actual location of a cardholder's home. The payment device feature data may be associated with a plurality of payment device features for each existing payment device of the plurality of existing payment devices. The transaction data may be associated with at least one transaction related feature of the respective group of users for each respective existing payment device of the plurality of payment devices. In some non-limiting embodiments or aspects, proposed spending behavior data and proposed payment device feature data associated with at least one proposed payment device may also be received. The proposed spending behavior data may be associated with a plurality of spending behavior-related features of a proposed group of users for the at least one proposed payment device. The proposed payment device feature data may be associated with a plurality of payment device features for the at least one proposed payment device. In some non-limiting embodiments or aspects, the at least one machine learning model may be trained to make a prediction. For example, the at least one machine learning model may be trained to predict at least one transaction metric associated with the transaction data based on the spending behavior data and the payment device feature data associated with each existing payment device of the plurality of existing payment devices. In some non-limiting embodiments or aspects, multiple machine learning models may be generated (e.g., trained, validated, re-trained, and/or the like) to predict multiple different metrics (e.g., one predicted metric per model). In some non-limiting embodiments or aspects, the significance of multiple different input features may be ranked based on the impacts to the multiple machine learning models. After training, the machine learning model(s) may predict at least one predicted transaction metric based on proposed payment device features of the proposed payment device and inferred spending behavior data associated with the proposed payment device (e.g., the same demographics of an existing card from the same issuer chosen for comparison). In some non-limiting embodiments or aspects, at least one predicted transaction metric may be predicted. For example, the at least one predicted transaction metric may be predicted based on the proposed spending behavior data and the proposed payment device feature data associated with the at least one proposed payment device using the at least one machine learning model. Predicting the at least one predicted transaction metric based on the proposed spending behavior data may provide a more accurate prediction of future spending than by simply observing transaction data and spending behavior data associated with existing payment devices (e.g., which fails to account for different demographics). For example, predicting the at least one predicted transaction metric based on the proposed spending behavior data may provide a more accurate value for a mean squared error (MSE) metric. In some non-limiting embodiments or aspects, at least one communication may be transmitted. For example, the at least one communication may be transmitted to a user based on the at least one predicted transaction metric. In this way, the present disclosure may predict how specific users (e.g., cardholders) may spend and generate and/or transmit a recommendation based on the prediction.

In some non-limiting embodiments or aspects, an average value of the at least one transaction related feature may be determined. The at least one predicted transaction metric may include a percentage change of the at least one transaction related feature relative to the average value of the at least one transaction related feature. In some non-limiting embodiments or aspects, the plurality of existing payment devices may include a comparison payment device. In some non-limiting embodiments or aspects, the at least one predicted transaction metric may be a percentage change of the at least one transaction related feature relative to an actual value of the at least one transaction related feature for the comparison payment device. In some non-limiting embodiments or aspects, the proposed spending behavior data may include the spending behavior data associated with the comparison payment device. In some non-limiting embodiments or aspects, at least a subset of the plurality of payment device features of each existing payment device may be matched with at least a subset of the plurality of payment device features of the at least one proposed payment device. The plurality of existing payment devices may be selected based on the matching. In some non-limiting embodiments or aspects, the at least one transaction metric may include a plurality of transaction metrics and the at least one machine learning model may include a plurality of machine learning models. Each respective machine learning model of the plurality of machine learning models may be associated with a respective transaction metric of the plurality of transaction metrics. In some non-limiting embodiments or aspects, a feature importance ranking of the plurality of payment device features may be determined. In some non-limiting embodiments or aspects, the at least one communication may be generated based on the feature of importance ranking. The feature importance ranking may be used to identify features that positively impact spending behavior.

In this way, the present disclosure may predict how a proposed payment device with proposed payment device features may impact the spending behavior of a new group of users based on the spending behavior of existing group of users of existing payment devices with similar features.

Referring now to FIG. 1, shown is an example system 100 for predicting consumer behavior based on demographics and new product features using machine learning models, according to some non-limiting embodiments or aspects. As shown in FIG. 1, system 100 may include machine learning model system 102, database 104, user device 106, and/or communication network 112.

Machine learning model system 102 may include one or more devices capable of receiving information from and/or communicating information to database 104 and/or user device 106 (e.g., directly via wired or wireless communication connection, indirectly via communication network 112, and/or the like). For example, machine learning model system 102 may include a computing device, such as a server, a group of servers, a desktop computer, a portable computer, a mobile device, and/or other like devices. In some non-limiting embodiments or aspects, machine learning model system 102 may be in communication with a data storage device (e.g., database 104), which may be local or remote to machine learning model system 102. In some non-limiting embodiments or aspects, machine learning model system 102 may be capable of receiving information from, storing information in, communicating information to, or searching information stored in the data storage device (e.g., database 104).

Database 104 may include one or more devices capable of receiving information from and/or communicating information to machine learning model system 102 and/or user device 106 (e.g., directly via wired or wireless communication connection, indirectly via communication network 112, and/or the like). For example, database 104 may include a computing device, such as a server, a group of servers, a desktop computer, a portable computer, a mobile device, and/or other like devices. In some non-limiting embodiments or aspects, database 104 may include a data storage device. In some non-limiting embodiments or aspects, database 104 may be capable of receiving information from, storing information in, communicating information to, or searching information stored in the data storage device. In some non-limiting embodiments or aspects, database 104 may be part of machine learning model system 102 and/or part of the same system as machine learning model system 102.

User device 106 may include one or more devices capable of receiving information from and/or communicating information to machine learning model system 102 and/or database 104 (e.g., directly via wired or wireless communication connection, indirectly via communication network 112, and/or the like). For example, user device 106 may include a computing device, such as a mobile device, a portable computer, a desktop computer, and/or other like devices. Additionally or alternatively, each user device 106 may include a device capable of receiving information from and/or communicating information to other user devices 106 (e.g., directly via wired or wireless communication connection, indirectly via communication network 112, and/or the like). In some non-limiting embodiments or aspects, user device 106 may be part of machine learning model system 102 and/or part of the same system as machine learning model system 102. For example, machine learning model system 102, database 104, and user device 106 may all be (and/or be part of) a single system and/or a single computing device.

Communication network 112 may include one or more wired and/or wireless networks. For example, communication network 112 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
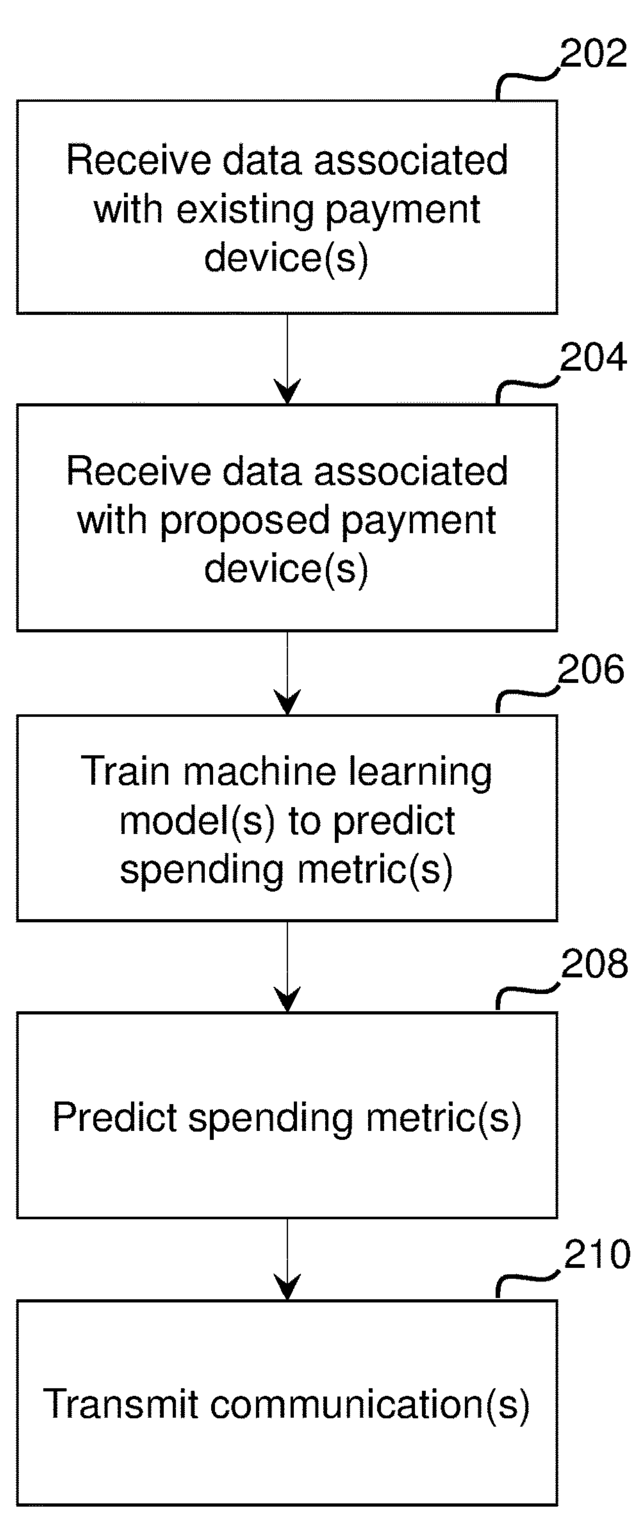
FIG. 2 is a flow diagram of a method for predicting consumer behavior based on demographics and new product features using machine learning models, according to some non-limiting embodiments or aspects.

Referring now to FIG. 2, shown is a flow diagram for a method 200 for predicting consumer behavior based on demographics and new product features using machine learning models, according to some non-limiting embodiments or aspects. The steps shown in FIG. 2 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. In some non-limiting embodiments or aspects, one or more of the steps of method 200 may be performed (e.g., completely, partially, and/or the like) by machine learning model system 102 (e.g., one or more devices of machine learning model system 102). In some non-limiting embodiments or aspects, one or more of the steps of method 200 may be performed (e.g., completely, partially, and/or the like) by another system, another device, another group of systems, or another group of devices, separate from or including machine learning model system 102, such as data storage system 104 and/or user device 106.

As shown in FIG. 2, at step 202, method 200 may include receiving data associated with existing payment device(s). For example, machine learning model system 102 may receive spending behavior data, payment device feature data, and/or transaction data associated with each payment device of a plurality of existing payment devices (e.g., from database 104 and/or user device 106). In some non-limiting embodiments or aspects, the spending behavior data may include demographic data, issuer attribute data, and macroeconomic data.

In some non-limiting embodiments or aspects, the spending behavior data may be associated with a plurality of spending behavior-related features. For example, the spending behavior data may be associated with a plurality of spending behavior-related features of a respective group of users for each respective existing payment device of the plurality of existing payment devices. The spending behavior data may include a geographic location, an age range, a military status, etc., associated with a respective group of users for a respective existing payment device of the plurality of existing payment devices. In some non-limiting embodiments or aspects, the issuer attribute data may include a footprint of the issuer (e.g., geographic location of the issuer). The macroeconomic data may include data associated with one or more macroeconomic conditions. The macroeconomic data may include data that identifies a location of a cardholder's home and/or an actual location of a cardholder's home.

In some non-limiting embodiments or aspects, the payment device feature data may be associated with a plurality of payment device features. For example, the payment device feature data may be associated with a plurality of payment device features for each existing payment device of the plurality of existing payment devices. The plurality of payment device features may include a payment device type, a material of the payment device (e.g., metal or plastic), tap-to-pay capabilities, inclusions (e.g., rewards programs, introduction bonuses), annual fees, travel benefits, etc. In some non-limiting embodiments or aspects, the payment device feature data for each existing payment device of the plurality of payment devices may include a plurality of binary flags. For example, each payment device feature of the plurality of payment device features may be associated with a binary flag. In some non-limiting embodiments or aspects, a binary flag associated with a payment device feature may be turned on or off based on whether or not a respective existing payment device of the plurality of existing payment devices includes the payment device feature.

In some non-limiting embodiments or aspects, the transaction data may be associated with at least one transaction related feature. For example, the transaction data may be associated with at least one transaction related feature of the respective group of users for each respective existing payment device of the plurality of payment devices. The transaction data may include transaction data, a transaction amount, a total amount spent (e.g., within a specified time period), and/or a total amount spent on specific items (e.g., food, gas, travel, etc.).

In some non-limiting embodiments or aspects, machine learning model system 102 may determine an average value of the at least one transaction related feature. For example, machine learning model system 102 may determine the average value of the at least one transaction related feature of the respective group of users for each respective existing payment device of the plurality of existing payment devices, in response to receiving the transaction data. Machine learning model system 102 may determine the average value of the total amount spent of the respective group of users for each respective existing payment device of the plurality of existing payment devices.

In some non-limiting embodiments or aspects, the plurality of existing payment devices may include at least one comparison payment device (e.g., an existing payment device from a same issuer as a proposed payment device). For example, machine learning model system 102 may receive spending behavior data, payment device feature data, and/or transaction data associated with the comparison payment device.

As shown in FIG. 2, at step 204, method 200 may include receiving data associated with proposed payment device(s). For example, machine learning model system 102 may receive proposed spending behavior data and proposed payment device feature data associated with at least one proposed payment device from user device 106.

In some non-limiting embodiments or aspects, the proposed spending behavior data may be associated with a plurality of spending behavior-related features of a proposed group of users for the at least one proposed payment device. The proposed spending behavior data may include inferred demographic information such as a geographic location, an age range, a military status, etc., for the proposed group of users for the at least one proposed payment device. In some non-limiting embodiments or aspects, the proposed spending behavior data may be inferred based on the spending behavior data associated with the comparison card(s).

In some non-limiting embodiments or aspects, the proposed payment device feature data may be associated with a plurality of payment device features for the at least one proposed payment device. The plurality of payment device features may include a payment device type, a material of the payment device (e.g., metal or plastic), tap-to-pay capabilities, inclusions (e.g., rewards programs, introduction bonuses), annual fees, travel benefits, etc. In some non-limiting embodiments or aspects, the payment device feature data for the proposed payment device may include a plurality of binary flags. For example, each payment device feature of the proposed payment device may be associated with a binary flag. In some non-limiting embodiments or aspects, a binary flag associated with a payment device feature of the proposed payment device may be turned on or off based on whether or not the proposed payment device includes the payment device feature.

In some non-limiting embodiments or aspects, machine learning model system 102 may receive the proposed spending behavior data and the proposed payment device feature data before or after receiving the spending behavior data, payment device feature data, and transaction data associated with each existing payment device of a plurality of existing payment devices.

In some non-limiting embodiments or aspects, in response to receiving the proposed spending behavior data and/or the proposed payment device feature data, machine learning model system 102 may determine a subset of the plurality of payment device features of the at least one proposed payment device. For example, machine learning model system 102 may determine the subset of the plurality of payment device features of the at least one proposed payment device based on the plurality of binary flags associated with the plurality of payment device features for the proposed payment device. The subset of the plurality of payment device features of the at least one proposed payment device may include at least one payment device feature of the plurality of proposed payment device features that is associated with a binary flag that is turned on.

In some non-limiting embodiments or aspects, machine learning model system 102 may match at least a subset of the plurality of payment device features of each existing payment device with the subset of the plurality of payment device features of the at least one proposed payment device. In some non-limiting embodiments or aspects, the plurality of existing payment devices may be selected based on the matching.

In some non-limiting embodiments or aspects, the plurality of existing payment devices may include a plurality of candidate existing payment devices. A subset of the plurality of payment device features of the plurality of candidate existing payment devices may be matched with the subset of the plurality of payment device features of the at least one proposed payment device to identify at least one of the plurality of candidate existing payment devices for selection as the plurality of existing payment devices.

In some non-limiting embodiments or aspects, machine learning model system 102 may select the plurality of existing payment devices based on the matching. In some non-limiting embodiments or aspects, the matching and selection may be performed before or after receiving the spending behavior data, payment device feature data, and/or transaction data associated with each existing payment device of a plurality of existing payment devices.

As shown in FIG. 2, at step 206, method 200 may include training machine learning model(s) to predict transaction metric(s). For example, machine learning model system 102 may train at least one machine learning model to predict at least one transaction metric associated with the transaction data based on the spending behavior data and the payment device feature data associated with each existing payment device of the plurality of existing payment devices. In some non-limiting embodiments or aspects, the at least one transaction metric may include a plurality of transaction metrics.

In some non-limiting embodiments or aspects, the at least one machine learning model may include a plurality of machine learning models. In some non-limiting embodiments or aspects, each respective machine learning model of the plurality of machine learning models may be associated with a respective transaction metric of the plurality of transaction metrics. For example, each respective machine learning model of the plurality of machine learning models may be trained to predict and/or output a respective transaction metric of the plurality of transaction metrics.

In some non-limiting embodiments or aspects, machine learning model system 102 may generate (e.g., train, validate, and/or re-train), store, and/or implement one or more machine learning models. The one or more machine learning models may be trained to perform at least one task (e.g., a classification task and/or a prediction task). Each of the one or more machine learning models may include an input layer, an output layer, and at least one hidden layer.

In some non-limiting embodiments or aspects, when training the at least one machine learning model, machine learning model system 102 may input a training dataset into the at least one machine learning model. The training dataset may include the data associated with the plurality of existing payment devices. For example, machine learning model system 102 may input the spending behavior data, the payment device feature data, and/or the transaction data associated with each payment device of the plurality of existing payment devices into the at least one machine learning model in response to receiving the spending behavior data, the payment device feature data, and/or the transaction data associated with each payment device of the plurality of existing payment devices.

In some non-limiting embodiments or aspects, machine learning model system 102 may train the at least one machine learning to make a prediction based on the at least one input and/or in response to receiving the at least one input. For example, machine learning model system 102 may train the at least one machine learning model to make a prediction based on the spending behavior data, the payment device feature data, and/or the transaction data associated with each payment device of the plurality of existing payment devices and/or in response to receiving the spending behavior data, the payment device feature data, and/or the transaction data associated with each payment device of the plurality of existing payment devices.

In some non-limiting embodiments or aspects, the at least one machine learning model may be trained to provide an output. For example, the at least one machine learning model may be trained to provide a prediction as an output based on the spending behavior data, the payment device feature data, and/or the transaction data associated with each payment device of the plurality of existing payment devices and/or in response to receiving the spending behavior data, the payment device feature data, and/or the transaction data associated with each payment device of the plurality of existing payment devices.

In some non-limiting embodiments or aspects, machine learning model system 102 may store and/or implement the at least one trained machine learning model. In some non-limiting embodiments or aspects, machine learning model system 102 may input at least the proposed spending behavior data and the proposed payment device feature data associated with the at least one proposed payment device into the at least one trained machine learning model.

In some non-limiting embodiments or aspects, training may include inputting the proposed spending behavior data and the proposed payment device feature data for each existing payment device of the plurality of existing payment devices to the machine learning model(s) to generate a predicted transaction metric (e.g., forward propagation). A loss may be determined based on the predicted transaction metric and the transaction data associated with each existing payment device of the plurality of existing payment devices. For example, the losses may be calculated based on a difference between the predicted transaction metric and the transaction data associated with each existing payment device of the plurality of existing payment devices, a loss function based on the predicted transaction metric and the transaction data associated with each existing payment device of the plurality of existing payment devices, an error, a mean error, a mean squared error (MSE), any combination thereof, and/or the like. The parameters of the machine learning model(s) may be updated based on the loss. For example, machine learning model system 102 may update (e.g., adjust) the parameters of the machine learning model(s) based on back propagation (e.g., of the loss(es)), gradient calculations (e.g., based on the loss(es)), any combination thereof, and/or the like.

In some non-limiting embodiments or aspects, training may further include repeating the training process (e.g., repeating inputting each the proposed spending behavior data and the proposed payment device feature data for each existing payment device of the plurality of existing payment devices to the machine learning model(s), determining the loss, and updating the parameters) until a termination condition is satisfied. For example, the termination condition may include a threshold level of accuracy, and the repetition may continue until the threshold level of accuracy is satisfied. Additionally or alternatively, the termination condition may include a target number of repetitions (e.g., a target number of epochs and/or the like), and the repetition may continue until the target number of repetitions is completed. In some non-limiting embodiments or aspects, there may be a plurality of termination conditions, and the repetition may continue until at least one of the plurality of termination conditions is satisfied.

As shown in FIG. 2, at step 208, method 200 may include predicting transaction metric(s). For example, machine learning model system 102 (e.g., the at least one trained machine learning model) may predict at least one predicted transaction metric based on the proposed spending behavior data and the proposed payment device feature data associated with the at least one proposed payment device. The at least one trained machine learning model may provide the predicted transaction metric as an output.

In some non-limiting embodiments or aspects, the at least one predicted transaction metric may include a percentage change of the at least one transaction related feature relative to the average value of the at least one transaction related feature.

In some non-limiting embodiments or aspects, where the plurality of existing payment devices includes the comparison payment device, the at least one predicted transaction metric may be a percentage change of the at least one transaction related feature relative to an actual value of the at least one transaction related feature for the comparison payment device.

In some non-limiting embodiments or aspects, machine learning model system 102 may generate communications. For example, machine learning model system 102 may generate a communication based on the at least one predicted transaction metric.

In some non-limiting embodiments or aspects, machine learning model system 102 may determine a feature importance ranking. For example, machine learning model system 102 may determine a feature importance ranking of the plurality of payment device features. When determining the feature importance ranking, machine learning model system 102 may determine a respective feature importance metric for each respective payment device feature of the plurality of payment device features. Machine learning model system 102 may rank (e.g., order) the plurality of payment device features based on the respective feature importance metric for each respective payment device feature to provide the feature importance ranking. In some non-limiting embodiments or aspects, a first feature importance rank of a first payment device feature that is higher than a second feature importance rank of a second payment device feature may indicate that the first payment device feature has a greater impact on the results of the at least one machine learning model.

In some non-limiting embodiments or aspects, machine learning model system 102 may generate at least one communication based on the feature importance ranking.

As shown in FIG. 2, at step 210, method 200 may include transmitting at least one communication. For example, machine learning model system 102 may transmit at least one communication to user device 106 in response to generating the at least one communication.

In some non-limiting embodiments or aspects, the at least one communication may include the at least one predicted transaction metric and/or data associated with the feature importance ranking. In some non-limiting embodiments or aspects, the communication may include a percentage lift of transaction metrics with respect to the comparison card (e.g., a purchase volume percentage lift (PV %), transaction volume percentage lift (TxN %), travel purchase volume percentage lift (travel PV %), food/dining purchase volume percentage lift (foodie PV %). In some non-limiting embodiments or aspects, the at least one communication may include a recommendation. For example, the at least one communication may include a recommendation (e.g., to launch a new product, to not launch a new product, to include at least one payment device feature, and/or to not include at least one payment device feature), where the recommendation may be determined based on the predicted metric(s).

In some non-limiting embodiments or aspects, user device 106 may receive the at least one communication transmitted by machine learning model system 102. For example, user device 106 may receive the at least one communication from machine learning model system 102, the at least one communication including the at least one predicted transaction metric and/or data associated with the feature importance ranking.

Figure 3A:
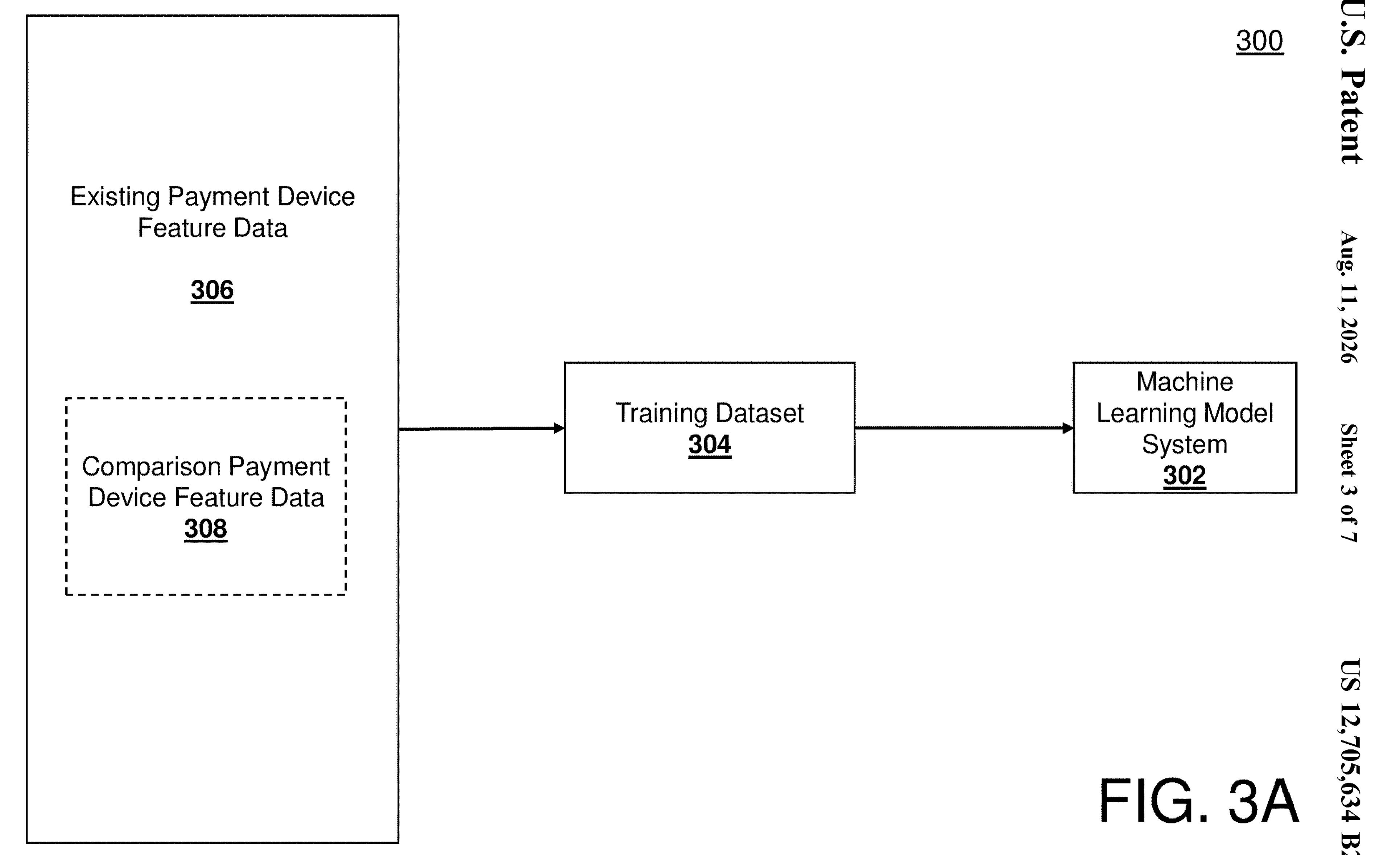
FIGS. 3A-3C are example diagrams of non-limiting embodiments or aspects of the method shown in FIG. 2.
Figure 3B:
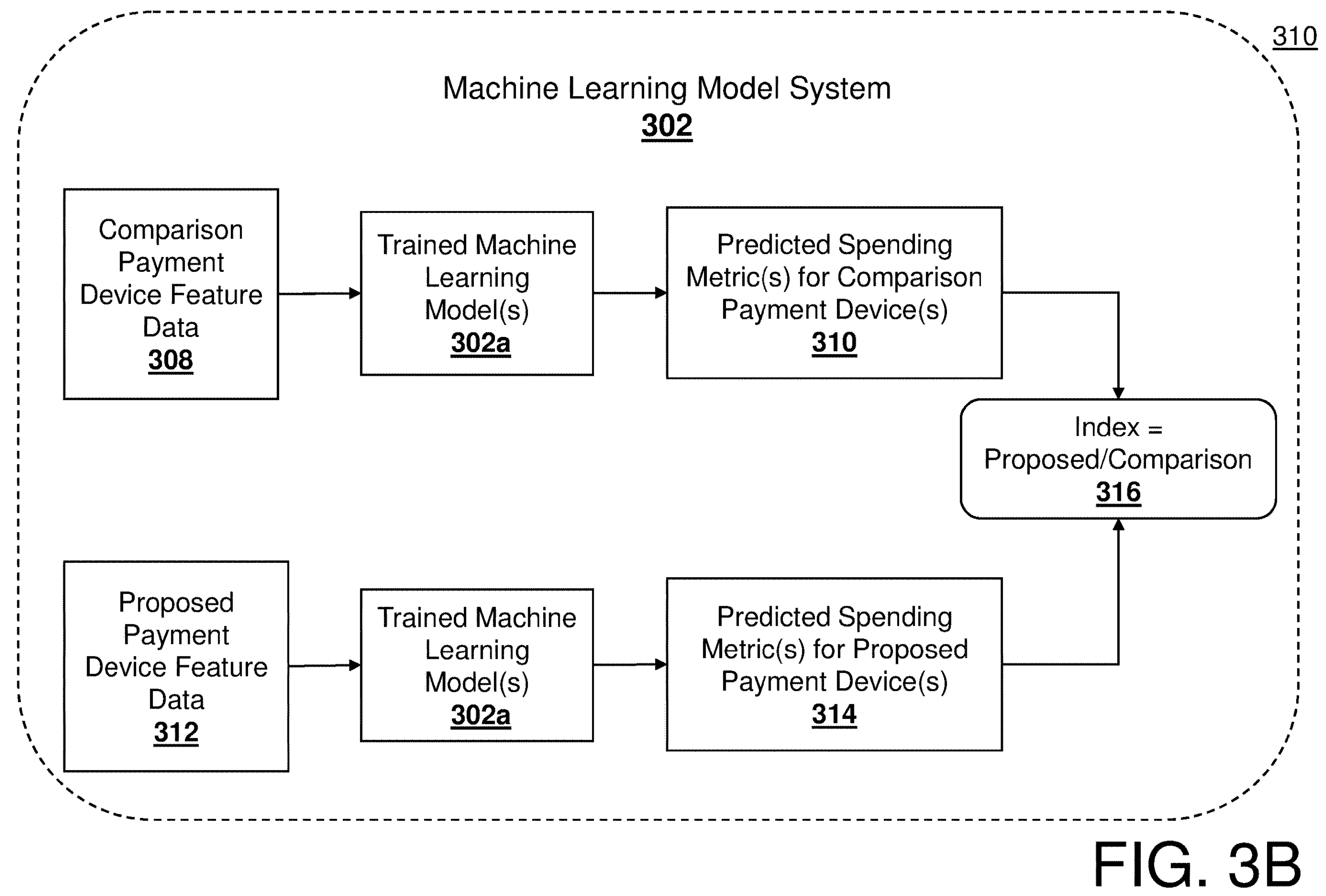
Figure 3C:
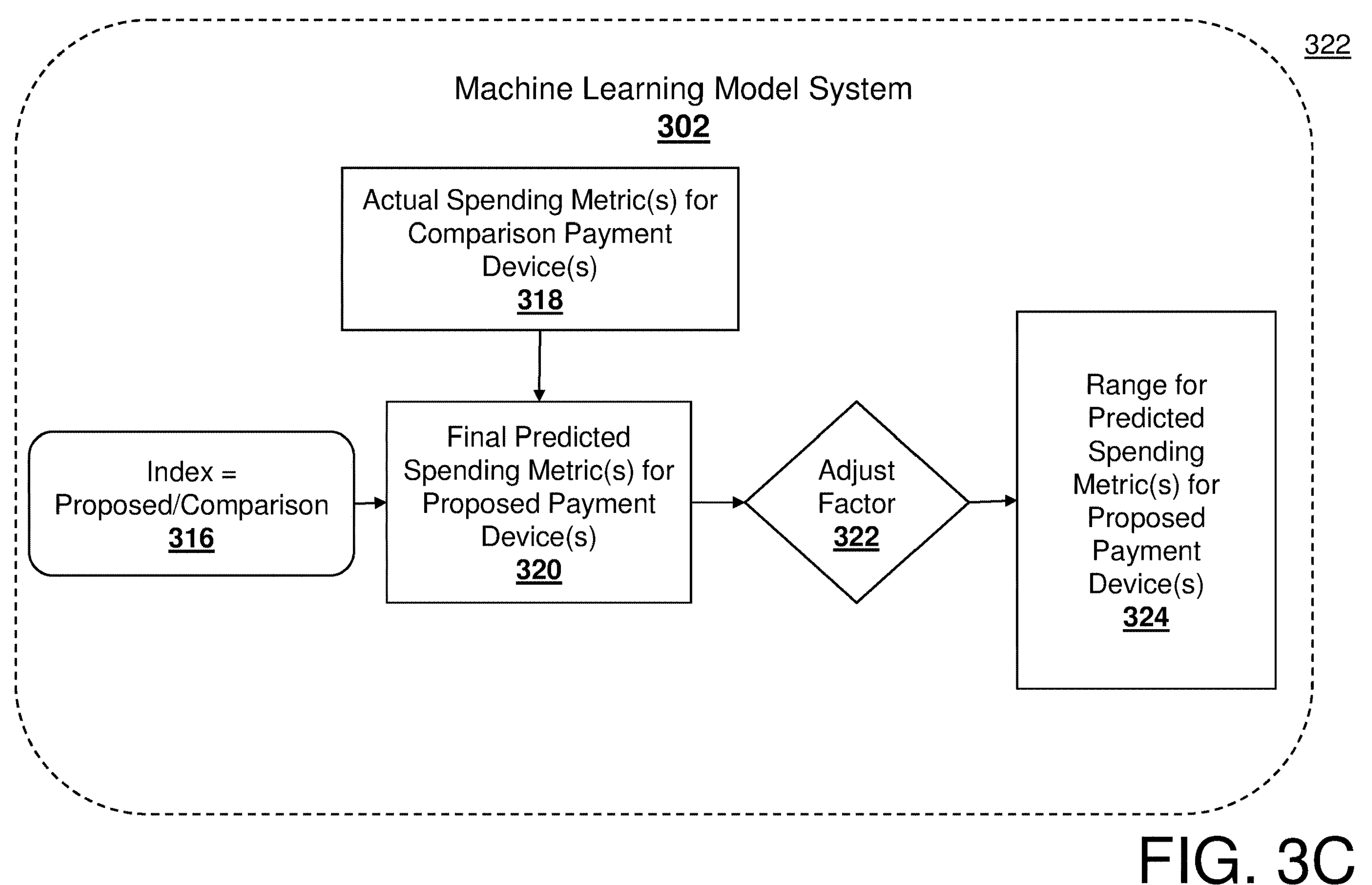

Referring now to FIGS. 3A-3C. FIGS. 3A-3C are example diagrams of non-limiting embodiments or aspects of the method shown in FIG. 2.

As shown in FIG. 3A, machine learning model system 302 may receive training dataset 304. For example, machine learning model system 302 may receive training dataset 304 from a database and/or a user device, as described herein. In some non-limiting embodiments or aspects, training dataset 304 may include existing payment device feature data 306 and/or comparison payment device feature data 308.

Existing payment device feature data 306 may include spending behavior data, payment device feature data, and/or transaction data associated with a plurality of existing payment devices. In some non-limiting embodiments or aspects, the spending behavior data may be associated with a plurality of spending behavior-related features of a respective group of users for each respective existing payment device of the plurality of existing payment devices. The spending behavior data may include a geographic location, an age range, a military status, etc., associated with a respective group of users for a respective existing payment device of the plurality of existing payment devices. In some non-limiting embodiments or aspects, the spending behavior data may include demographic data, issuer attribute data, and macroeconomic data. The issuer attribute data may include a footprint of the issuer (e.g., geographic location of the issuer). The macroeconomic data may include data associated with one or more macroeconomic conditions. The macroeconomic data may include data that identifies a location of a cardholder's home and/or an actual location of a cardholder's home.

In some non-limiting embodiments or aspects, the payment device feature data may be associated with a plurality of payment device features for each existing payment device of the plurality of existing payment devices. The plurality of payment device features may include a payment device type, a material of the payment device (e.g., metal or plastic), tap-to-pay capabilities, inclusions (e.g., rewards programs, introduction bonuses), annual fees, travel benefits, etc. In some non-limiting embodiments or aspects, the payment device feature data for each existing payment device of the plurality of payment devices may include a plurality of binary flags. For example, each payment device feature of the plurality of payment device features may be associated with a binary flag. In some non-limiting embodiments or aspects, a binary flag associated with a payment device feature may be turned on or off based on whether or not a respective existing payment device of the plurality of existing payment devices includes the payment device feature.

In some non-limiting embodiments or aspects, the transaction data may be associated with at least one transaction related feature of the respective group of users for each respective existing payment device of the plurality of payment devices. The transaction data may include transaction data, a transaction amount, a total amount spent (e.g., within a specified time period), and/or a total amount spent on specific items (e.g., food, gas, travel, etc.).

In some non-limiting embodiments or aspects, the plurality of existing payment devices may include a comparison payment device. In some non-limiting embodiments or aspects, existing payment device data 306 may include comparison payment device data 308.

Comparison payment device feature data 308 spending behavior data, payment device feature data, and/or transaction data associated with the comparison payment device. In some non-limiting embodiments or aspects, the spending behavior data of the comparison payment device may be associated with a plurality of spending behavior-related features of a respective group of users for the comparison payment device. The spending behavior data of the comparison payment device may include a geographic location, an age range, a military status, etc., associated with the respective group of users for comparison payment device.

In some non-limiting embodiments or aspects, the payment device feature data of the comparison payment device may be associated with a plurality of payment device features for each existing payment device of the comparison payment device. The plurality of payment device features of the comparison payment device may include a payment device type, a material of the payment device (e.g., metal or plastic), tap-to-pay capabilities, inclusions (e.g., rewards programs, introduction bonuses), annual fees, travel benefits, etc. In some non-limiting embodiments or aspects, the payment device feature data for comparison payment device may include a plurality of binary flags. For example, each payment device feature of the plurality of payment device features of the comparison payment device may be associated with a binary flag. In some non-limiting embodiments or aspects, a binary flag associated with a payment device feature of the comparison payment device may be turned on or off based on whether or not the comparison payment device includes the payment device feature.

In some non-limiting embodiments or aspects, the transaction data of comparison payment device may be associated with at least one transaction related feature of the respective group of users for the comparison payment device. The transaction data may include transaction data, a transaction amount, a total amount spent (e.g., within a specified time period), and/or a total amount spent on specific items (e.g., food, gas, travel, etc.).

In some non-limiting embodiments or aspects, machine learning model system 302 may generate (e.g., train, validate, and/or re-train), store, and/or implement one or more machine learning models. The one or more machine learning models may be trained to perform at least one task (e.g., a classification task and/or a prediction task). Each of the one or more machine learning models may include an input layer, an output layer, and at least one hidden layer.

In some non-limiting embodiments or aspects, machine learning model system 302 may train at least one machine learning model based on training dataset 304. For example, machine learning model system 302 may train to predict at least one transaction metric associated with the transaction data based on the spending behavior data and the payment device feature data associated with each existing payment device of the plurality of existing payment devices. In some non-limiting embodiments or aspects, the at least one transaction metric may include a plurality of transaction metrics.

In some non-limiting embodiments or aspects, when training the at least one machine learning model, machine learning model system 302 may input training dataset 304 into the at least one machine learning model in response to receiving training dataset 304. For example, machine learning model system 302 may input the spending behavior data, the payment device feature data, and/or the transaction data associated with each payment device of the plurality of existing payment devices into the at least one machine learning model in response to receiving the spending behavior data, the payment device feature data, and/or the transaction data associated with each payment device of the plurality of existing payment devices.

In some non-limiting embodiments or aspects, machine learning model system 302 may train the at least one machine learning to make a prediction based on training dataset 304. For example, machine learning model system 302 may train the at least one machine learning model to make a prediction based on the spending behavior data, the payment device feature data, and/or the transaction data associated with each payment device of the plurality of existing payment devices and/or in response to receiving the spending behavior data, the payment device feature data, and/or the transaction data associated with each payment device of the plurality of existing payment devices.

In some non-limiting embodiments or aspects, the at least one machine learning model may be trained to provide an output generated based on training dataset 304. For example, the at least one machine learning model may be trained to provide a prediction as an output generated based on the spending behavior data, the payment device feature data, and/or the transaction data associated with each payment device of the plurality of existing payment devices and/or in response to receiving the spending behavior data, the payment device feature data, and/or the transaction data associated with each payment device of the plurality of existing payment devices.

In some non-limiting embodiments or aspects, machine learning model system 302 may store and/or implement the at least one trained machine learning model.

As shown in FIG. 3B, machine learning model system 302 may input comparison payment device feature data 308 and/or proposed payment device feature data 312 into trained machine learning model(s) 302*a*.

In some non-limiting embodiments or aspects, proposed payment device feature data 312 may include spending behavior data associated with at least one proposed payment device and/or proposed payment device feature data associated with at least one proposed payment device.

In some non-limiting embodiments or aspects, the proposed spending behavior data may be associated with a plurality of spending behavior-related features of a proposed group of users for the at least one proposed payment device. The proposed spending behavior data may include inferred demographic information such as a geographic location, an age range, a military status, etc., for the proposed group of users for the at least one proposed payment device. In some non-limiting embodiments or aspects, the proposed spending behavior data may be inferred based on the spending behavior data associated with the comparison card.

In some non-limiting embodiments or aspects, the proposed payment device feature data may be associated with a plurality of payment device features for the at least one proposed payment device. The plurality of payment device features may include a payment device type, a material of the payment device (e.g., metal or plastic), tap-to-pay capabilities, inclusions (e.g., rewards programs, introduction bonuses), annual fees, travel benefits, etc. In some non-limiting embodiments or aspects, the payment device feature data for the proposed payment device may include a plurality of binary flags. For example, each payment device feature of the proposed payment device may be associated with a binary flag. In some non-limiting embodiments or aspects, a binary flag associated with a payment device feature of the proposed payment device may be turned on or off based on whether or not the proposed payment device includes the payment device feature.

In some non-limiting embodiments or aspects, machine learning model(s) 302*a* may receive proposed payment device feature data 312 before, after, or at the same time as receiving comparison payment device feature data 308.

In some non-limiting embodiments or aspects, in response to receiving proposed payment device feature data 312, machine learning model system 302 may determine a subset of the plurality of payment device features of the at least one proposed payment device. For example, machine learning model system 302 may determine the subset of the plurality of payment device features of the at least one proposed payment device based on the plurality of binary flags associated with the plurality of payment device features for the proposed payment device. The subset of the plurality of payment device features of the at least one proposed payment device may include at least one payment device feature of the plurality of proposed payment device features that is associated with a binary flag that is turned on.

In some non-limiting embodiments or aspects, machine learning model system 102 may match at least a subset of the plurality of payment device features of each existing payment device with the subset of the plurality of payment device features of the at least one proposed payment device. In some non-limiting embodiments or aspects, the plurality of existing payment devices may be selected based on the matching.

In some non-limiting embodiments or aspects, the plurality of existing payment devices may include a plurality of candidate existing payment devices. A subset of the plurality of payment device features of the plurality of candidate existing payment devices may be matched with the subset of the plurality of payment device features of the at least one proposed payment device to identify at least one of the plurality of candidate existing payment devices for selection as the plurality of existing payment devices.

In some non-limiting embodiments or aspects, machine learning model system 302 may select the plurality of existing payment devices based on the matching. In some non-limiting embodiments or aspects, the matching and selection may be performed before or after receiving the spending behavior data, payment device feature data, and transaction data associated with each existing payment device of a plurality of existing payment devices.

In some non-limiting embodiments or aspects, trained machine learning model(s) 302*a* may be trained to predict at least one transaction metric. In some non-limiting embodiments or aspects, trained machine learning model(s) 302*a* may predict and provide predicted transaction metric(s) for comparison payment device(s) 310. For example, machine learning model(s) 302*a* may predict and provide at least one predicted transaction metric for at least one comparison payment device based on comparison payment device feature data 308.

In some non-limiting embodiments or aspects, trained machine learning model(s) 302*a* may predict and provide predicted transaction metric(s) for proposed payment device(s) 314. For example, machine learning model(s) 302*a* may predict and provide at least one predicted transaction metric for the proposed payment device based on proposed payment device feature data 312.

In some non-limiting embodiments or aspects, machine learning model system 302 may calculate index 316. For example, machine learning model system 302 may calculate index 316 based on the at least one predicted transaction metric for the at least one existing payment device and the at least one predicted transaction metric for the at least one proposed payment device. Index 316 may be a value of the at least one predicted transaction metric for the at least one proposed payment device divided by the at least one predicted transaction metric for the at least one existing payment device. In some non-limiting embodiments or aspects, index 316 may be a comparison index used to compare the at least one proposed payment device with the at least one existing payment device. In some non-limiting embodiments or aspects, the index may be based on percentage lift of the predicted transaction metric(s) for comparison payment devices 310 and/or the predicted transaction metric(s) for proposed payment device(s) 314. The percentage lift of the predicted transaction metric(s) for comparison payment devices 310 and/or the percentage lift of the predicted transaction metric(s) for proposed payment device(s) 314 may include a purchase volume percentage lift (PV %), a transaction volume percentage lift (TxN %), a travel purchase volume percentage lift (travel PV %), and/or a food/dining purchase volume percentage lift (foodie PV %).

As shown in FIG. 3C, machine learning model system 302 may determine range for predicted transaction metric(s) for proposed payment device(s) 322. For example, machine learning model system 302 may determine a range of values for the at least one predicted transaction metric for the at least one proposed payment device.

In some non-limiting embodiments or aspects, machine learning model system 302 may determine the range of values for the at least one predicted transaction metric for the at least one proposed payment device based on index 316, final predicted transaction metric(s) for proposed payment device(s) 320 (e.g., at least one final predicted transaction metric for the at least one proposed payment device), actual transaction metric(s) for comparison payment device(s) 318 (e.g., at least one actual transaction metric for the at least one comparison payment device), and/or adjust factor 320.

In some non-limiting embodiments or aspects, final predicted transaction metric(s) for proposed payment device(s) 320 may be determined based on index 316 and/or at least one actual transaction metric for at least one comparison payment device 318. For example, machine learning model system 302 may determine at least one final predicted transaction metric for at least one proposed payment device based on index 316 and/or at least one actual transaction metric for at least one comparison payment device 318.

In some non-limiting embodiments or aspects, machine learning model system 302 may adjust final predicted transaction metric(s) for proposed payment device(s) 320 by adjustment factor 322 to provide range for predicted transaction metric(s) for proposed payment device(s) 324. For example, machine learning model system 302 may adjust the at least one final predicted transaction metric for the at least one proposed payment device based on a value of an adjustment factor to provide a range for the at least one predicted transaction metric for the at least one proposed payment device.

Figure 4:
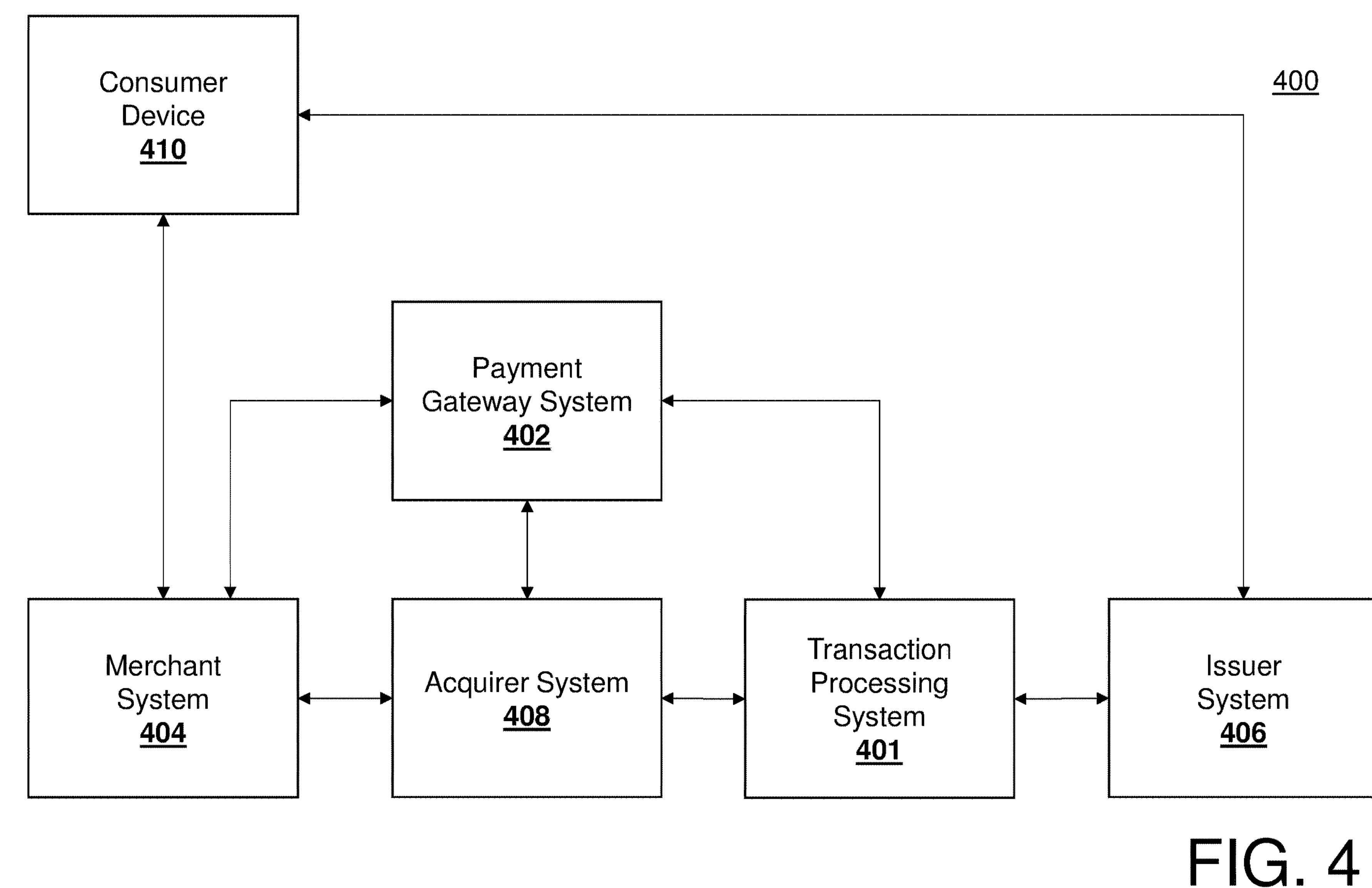
FIG. 4 is a schematic diagram of an example payment processing network in which systems, methods, and/or computer program products, described herein, may be implemented, according to some non-limiting embodiments or aspects.

Referring now to FIG. 4, depicted is a schematic diagram of an example payment processing network 400 in which systems, methods, and/or computer program product, described herein, may be implemented, according to non-limiting embodiments or aspects. In some non-limiting embodiments or aspects, payment processing network 400 may be used in conjunction with the systems, methods, and/or computer program products described herein, and/or the systems, methods, and/or computer program products described herein may be implemented in payment processing network 400. As shown in FIG. 4, payment processing network 400 may include transaction processing system 401, payment gateway system 402, merchant system 404, issuer system 406, acquirer system 408, and/or consumer device 410. In some non-limiting embodiments or aspects, each of machine learning model system 102, data storage system 104, and/or user device 106 of FIG. 1 may be implemented by (e.g., part of) transaction processing system 401. In some non-limiting embodiments or aspects, at least one of machine learning model system 102, data storage system 104, and/or user device 106 of FIG. 1 may be implemented by (e.g., part of) another system, another device, another group of systems, or another group of devices, separate from or including transaction processing system 401, such as merchant system 404, issuer system 406, acquirer system 408, consumer device 410, and/or the like. For example, user device 106 may be implemented by (e.g., part of) at least one of payment gateway system 402, merchant system 404, issuer system 406, acquirer system 408, and/or consumer device 410. Additionally or alternatively, for example, data storage system 104 may be implemented by (e.g., part of) at least one of payment gateway system 402, merchant system 404, issuer system 406, acquirer system 408, and/or consumer device 410.

Transaction processing system 401 may include one or more devices capable of receiving information from and/or communicating information to payment gateway system 402, merchant system 404, issuer system 406, acquirer system 408, consumer device 410, and/or the like (e.g., directly, indirectly, via a public and/or private communication network connection, and/or the like). For example, as shown in FIG. 4, transaction processing system 401 may be in communication with one or more issuer systems (e.g., issuer system 406), one or more acquirer systems (e.g., acquirer system 408), and/or one or more payment gateway systems (e.g., payment gateway system 402). Although only a single issuer system 406, single acquirer system 408, and single payment gateway system 402 are shown, it will be appreciated that transaction processing system 401 may be in communication with a plurality of issuer systems, a plurality of acquirer systems, and/or a plurality of payment gateways. In some non-limiting embodiments or aspects, transaction processing system 401 may include a computing device, such as a server (e.g., a transaction processing server), a group of servers, and/or other like devices. In some non-limiting embodiments or aspects, transaction processing system 401 may be in communication with a data storage device, which may be local or remote to transaction processing system 401. In some non-limiting embodiments or aspects, transaction processing system 401 may be capable of receiving information from, storing information in, communicating information to, or searching information stored in the data storage device. In some non-limiting embodiments or aspects, transaction processing system 401 may be associated with a transaction service provider, as described herein. In some non-limiting embodiments or aspects, transaction processing system 401 may also operate as an issuer system such that both transaction processing system 401 and issuer system 406 are a single system and/or controlled by a single entity.

Payment gateway system 402 may include one or more devices capable of receiving information from and/or communicating information to transaction processing system 401, merchant system 404, issuer system 406, acquirer system 408, consumer device 410, and/or the like (e.g., directly, indirectly, via a public and/or private communication network connection, and/or the like). For example, as shown in FIG. 4, payment gateway system 402 may be in communication with one or more merchant systems (e.g., merchant system 404), one or more acquirer systems (e.g., acquirer system 408), and/or one or more transaction processing systems (e.g., transaction processing system 401). Although only a single merchant system 404, single acquirer system 408, and single transaction processing system 401 are shown, it will be appreciated that payment gateway system 402 may be in communication with a plurality of merchant systems, a plurality of acquirer systems, and/or a plurality of transaction processing systems. In some non-limiting embodiments or aspects, payment gateway system 402 may include a computing device, such as a server, a group of servers, and/or other like devices. In some non-limiting embodiments or aspects, payment gateway system 402 may be associated with a payment gateway, as described herein.

Merchant system 404 may include one or more devices capable of receiving information from and/or communicating information to transaction processing system 401, payment gateway system 402, issuer system 406, acquirer system 408, consumer device 410, and/or the like (e.g., directly, indirectly, via a public and/or private communication network connection, and/or the like). For example, as shown in FIG. 4, merchant system 404 may be in communication with one or more payment gateway systems (e.g., payment gateway system 402), one or more acquirer systems (e.g., acquirer system 408), and/or one or more consumer devices (e.g., consumer device 410). Although only a single payment gateway system 402, single acquirer system 408, and single consumer device 410 are shown, it will be appreciated that merchant system 404 may be in communication with a plurality of payment gateway systems, a plurality of acquirer systems, and/or a plurality of consumer devices. In some non-limiting embodiments or aspects, merchant system 404 may include a computing device, such as a server, a group of servers, a client device, a group of client devices, a POS device, a POS system, computers, computer systems, peripheral devices, and/or other like devices. In some non-limiting embodiments or aspects, merchant system 404 may be associated with a merchant, as described herein. In some non-limiting embodiments or aspects, merchant system 404 may include a device capable of receiving information from and/or communicating information to consumer device 410 via a short range communication connection (e.g., an NFC communication connection, an RFID communication connection, a Bluetooth® communication connection, a Zigbee® communication connection, and/or the like) with consumer device 410 and/or the like. In some non-limiting embodiments or aspects, merchant system 404 may include one or more client devices. For example, merchant system 404 may include a client device that allows a merchant to communicate information to transaction processing system 401 (e.g., via at least one of acquirer system 408 and/or payment gateway system 402). In some non-limiting embodiments or aspects, merchant system 404 (e.g., a client device thereof, a POS device thereof, and/or the like) may also operate as a payment gateway system such that both merchant system 404 and payment gateway system 402 are a single system and/or controlled by a single entity.

Issuer system 406 may include one or more devices capable of receiving information and/or communicating information to transaction processing system 401, payment gateway system 402, merchant system 404, acquirer system 408, consumer device 410, and/or the like (e.g., directly, indirectly, via a public and/or private communication network connection, and/or the like). For example, as shown in FIG. 4, issuer system 406 may be in communication with one or more transaction processing systems (e.g., transaction processing system 401) and/or one or more consumer devices (e.g., consumer device 410). Although only a single transaction processing system 401 and a single consumer device 410 are shown, it will be appreciated that issuer system 406 may be in communication with a plurality of transaction processing systems and/or a plurality of consumer devices 410. In some non-limiting embodiments or aspects, issuer system 406 may include a computing device, such as a server, a group of servers, and/or other like devices. In some non-limiting embodiments or aspects, issuer system 406 may be associated with an issuer institution, as described herein. For example, issuer system 406 may be associated with an issuer institution that issued a credit account, debit account, credit card, debit card, a payment device, and/or the like to a user associated with consumer device 410.

Acquirer system 408 may include one or more devices capable of receiving information from and/or communicating information to transaction processing system 401, payment gateway system 402, merchant system 404, issuer system 406, consumer device 410, and/or the like (e.g., directly, indirectly, via a public and/or private communication network connection, and/or the like). For example, as shown in FIG. 4, acquirer system 408 may be in communication with one or more transaction processing systems (e.g., transaction processing system 401), one or more payment gateway systems (e.g., payment gateway system 402), and/or one or more merchant systems (e.g., merchant system 404). Although only a single transaction processing system 401, a single payment gateway system 402, and a single merchant system 404 are shown, it will be appreciated that acquirer system 408 may be in communication with a plurality of transaction processing systems, a plurality of payment gateway systems, and/or a plurality of merchant systems. In some non-limiting embodiments or aspects, acquirer system 408 may include a computing device, such as a server, a group of servers, and/or other like devices. In some non-limiting embodiments or aspects, acquirer system 408 may be associated with an acquirer institution, as described herein.

Consumer device 410 may include one or more devices capable of receiving information from and/or communicating information to transaction processing system 401, payment gateway system 402, merchant system 404, issuer system 406, acquirer system 408, and/or the like (e.g., directly, indirectly, via a public and/or private communication network connection, and/or the like). For example, as shown in FIG. 4, consumer device 410 may be in communication with one or more merchant systems (e.g., merchant system 404) and/or one or more issuer systems (e.g., issuer system 406). Although only a single merchant system 404 and a single issuer system 406 are shown, it will be appreciated that consumer device 410 may be in communication with a plurality of merchant systems and/or a plurality of issuer systems. In some non-limiting embodiments or aspects, consumer device 410 may be associated with a user to whom a credit account, debit account, credit card, debit card, a payment device, and/or the like has been issued. In some non-limiting embodiments or aspects, user device 410 may include a computing device, such as a computer, a portable computer, a laptop computer, a tablet computers, a mobile device, a cellular phone, a smartphone, a wearable device (e.g., watches, glasses, lenses, clothing, and/or the like), a PDA, a client device, and/or other like devices. In some non-limiting embodiments or aspects, user device 410 may include a payment device, as described herein. In some non-limiting embodiments or aspects, consumer device 410 may include a device capable of receiving information from and/or communicating information to other customer devices 410 (e.g., directly, indirectly, via a public and/or private communication network connection, a short range communication connection, and/or the like). In some non-limiting embodiments or aspects, consumer device 410 may include a device capable of receiving information from and/or communicating information to merchant system 404 via a short range communication connection (e.g., an NFC communication connection, an RFID communication connection, a Bluetooth® communication connection, a Zigbee® communication connection, and/or the like) with merchant system 404 and/or the like. In some non-limiting embodiments or aspects, consumer device 410 may include a client device.

In some non-limiting embodiments or aspects, transaction processing system 401 may communicate with merchant system 404 directly (e.g., via a public and/or private communication network connection and/or the like). Additionally or alternatively, transaction processing system 401 may communicate with merchant system 404 through payment gateway 402 and/or acquirer system 408. In some non-limiting embodiments or aspects, an acquirer system 408 associated with merchant system 404 may operate as payment gateway 402 to facilitate the communication of transaction messages (e.g., authorization requests) from merchant system 404 to transaction processing system 401. In some non-limiting embodiments or aspects, merchant system 404 may communicate with payment gateway 402 directly (e.g., via a public and/or private communication network connection and/or the like). For example, a merchant system 404 that includes a physical POS device may communicate with payment gateway 402 through a public or private network to conduct card-present transactions. As another example, a merchant system 404 that includes a server (e.g., a web server) may communicate with payment gateway 402 through a public or private network, such as the Internet, to conduct card-not-present transactions.

For the purpose of illustration, processing a transaction (e.g., a payment transaction) may include generating a transaction message (e.g., authorization request and/or the like) based on an account identifier of a customer (e.g., accountholder associated with customer device 410 and/or the like) and/or transaction data associated with the transaction. For example, merchant system 404 (e.g., a client device of merchant system 404, a POS device of merchant system 404, and/or the like) may initiate the transaction, e.g., by generating an authorization request (e.g., in response to receiving the account identifier from a payment device and/or a portable financial device of the customer and/or the like). Merchant system 404 may communicate the authorization request to payment gateway 402 and/or acquirer system 408. In some non-limiting embodiments or aspects, payment gateway 402 may communicate the authorization request to acquirer system 408 and/or transaction processing system 401. Additionally or alternatively, acquirer system 408 (and/or payment gateway 402) may communicate the authorization request to transaction processing system 401. After receiving the authorization request from merchant system 404 that identifies the account identifier of the customer (e.g., the accountholder associated with consumer device 410 and/or the account identifier), transaction processing system 401 may communicate the authorization request to issuer system 406 (e.g., the issuer system that issued the payment device and/or account identifier). Issuer system 406 may determine an authorization decision (e.g., approve, deny, and/or the like) based on the authorization request, and/or issuer system 406 may generate an authorization response based on the authorization decision and/or the authorization request. Issuer system 406 may communicate the authorization response to transaction processing system 401. Transaction processing system 401 may communicate the authorization response to acquirer system 408 and/or payment gateway 402. In some non-limiting embodiments or aspects, acquirer system 408 may communicate the authorization response to payment gateway 402 and/or merchant system 404. Additionally or alternatively, payment gateway 402 (and/or acquirer system 408) may communicate the authorization response to merchant system 404.

For the purpose of illustration, clearing and/or settlement of a transaction may include generating a message (e.g., clearing message and/or the like) based on an account identifier of a customer (e.g., associated with customer device 410 and/or the like) and/or transaction data associated with the transaction. For example, merchant system 404 may generate at least one clearing message (e.g., a plurality of clearing messages, a batch of clearing messages, and/or the like). Merchant system 404 may communicate the clearing message(s) to acquirer system 408 (and/or payment gateway 402, which may communicate the clearing message(s) to acquirer system 408). Acquirer system 408 may communicate the clearing message(s) to transaction processing system 401. Transaction processing system 401 may communicate the clearing message(s) to issuer system 406. Issuer system 406 may generate at least one settlement message based on the clearing message(s). In some non-limiting embodiments or aspects, issuer system 406 may communicate the settlement message(s) and/or funds to transaction processing system 401 (and/or a settlement bank system associated with transaction processing system 401), and transaction processing system 401 (and/or the settlement bank system) may communicate the settlement message(s) and/or funds to acquirer system 408. Additionally or alternatively, issuer system 406 may communicate the settlement message(s) and/or funds to acquirer system 408. In some non-limiting embodiments or aspects, acquirer system 408 may communicate settlement message(s) and/or funds to merchant system 404 (and/or an account associated with merchant system 404).

In some non-limiting embodiments or aspects, transaction processing system 401 and/or issuer system 406 may include at least one machine learning model (e.g., at least one of a fraud detection model, a risk detection model, a transaction authorization model, a credit approval model, a product recommendation model, a classifier model, an anomaly detection model, an authentication model, any combination thereof, and/or the like). Transaction processing system 401 and/or issuer system 406 may perform at least one task (e.g., generate at least one prediction) based on the authorization request and the machine learning model(s). For example, performing the task(s) may include generating at least one prediction associated with fraud detection, risk detection, transaction authorization, credit approval, product recommendation, classification, anomaly detection, authentication, any combination thereof, and/or the like. In some non-limiting embodiments or aspects, transaction processing system 401 may communicate at least one message based on performing the task (e.g., generating the prediction) to issuer system 406 (e.g., along with the authorization request). In some non-limiting embodiments or aspects, issuer system 406 may determine the authorization decision (e.g., approve, deny, and/or the like) based on the authorization request and the performance of the task (e.g., generation of the prediction).

The systems and/or devices of FIG. 4 may communicate via one or more wired and/or wireless communication networks. For example, the communication network(s) may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 4 are provided as an example. There may be additional systems, devices, and/or networks; fewer systems, devices, and/or networks; different systems, devices, and/or networks; and/or differently arranged systems, devices, and/or networks than those shown in FIG. 4. Furthermore, two or more systems or devices shown in FIG. 4 may be implemented within a single system or device, or a single system or device shown in FIG. 4 may be implemented as multiple, distributed systems or devices. Additionally or alternatively, a set of systems (e.g., one or more systems) or a set of devices (e.g., one or more devices) of payment processing network 400 may perform one or more functions described as being performed by another set of systems or another set of devices of payment processing network 400.

Figure 5:
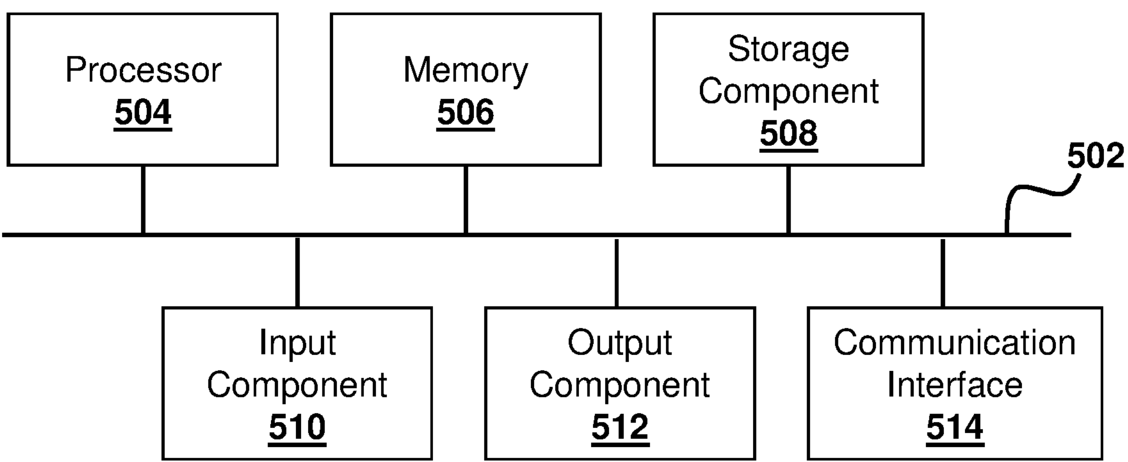
FIG. 5 is a schematic diagram of example components of one or more devices of FIGS. 1 and 4, according to some non-limiting embodiments or aspects.

Referring now to FIG. 5, shown is a diagram of example components of a device 500 according to non-limiting embodiments. Device 500 may correspond to machine learning system 102, database 104, user device 106, transaction service provider system 402, issuer system 404, user device 406, merchant system 408, and/or acquirer system 410, as an example. In some non-limiting embodiments, such systems or devices may include at least one device 500 and/or at least one component of device 500. The number and arrangement of components shown are provided as an example. In some non-limiting embodiments, device 500 may include additional components, fewer components, different components, or differently arranged components than those shown. Additionally, or alternatively, a set of components (e.g., one or more components) of device 500 may perform one or more functions described as being performed by another set of components of device 500.

As shown in FIG. 5, device 500 may include a bus 502, a processor 504, memory 506, a storage component 508, an input component 510, an output component 512, and a communication interface 514. Bus 502 may include a component that permits communication among the components of device 500. In some non-limiting embodiments, processor 504 may be implemented in hardware, firmware, or a combination of hardware and software. For example, processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 506 may include random access memory (RAM), read only memory (ROM), and/or another type of dynamic or static storage device (e.g., flash memory, magnetic memory, optical memory, etc.) that stores information and/or instructions for use by processor 504.

With continued reference to FIG. 5, storage component 508 may store information and/or software related to the operation and use of device 500. For example, storage component 508 may include a hard disk (e.g., a magnetic disk, an optical disk, a magneto-optic disk, a solid-state disk, etc.) and/or another type of computer-readable medium. Input component 510 may include a component that permits device 500 to receive information, such as via user input (e.g., a touch screen display, a keyboard, a keypad, a mouse, a button, a switch, a microphone, etc.). Additionally, or alternatively, input component 510 may include a sensor for sensing information (e.g., a global positioning system (GPS) component, an accelerometer, a gyroscope, an actuator, etc.). Output component 512 may include a component that provides output information from device 500 (e.g., a display, a speaker, one or more light-emitting diodes (LEDs), etc.). Communication interface 514 may include a transceiver-like component (e.g., a transceiver, a separate receiver and transmitter, etc.) that enables device 500 to communicate with other devices, such as via a wired connection, a wireless connection, or a combination of wired and wireless connections. Communication interface 514 may permit device 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 500 may perform one or more processes described herein. Device 500 may perform these processes based on processor 504 executing software instructions stored by a computer-readable medium, such as memory 506 and/or storage component 508. A computer-readable medium may include any non-transitory memory device. A memory device includes memory space located inside of a single physical storage device or memory space spread across multiple physical storage devices. Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:

at least one processor configured to:

receive spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices;

receive proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device;

train a plurality of machine learning models to predict a plurality of transaction metrics associated with the transaction data based on the spending behavior data and the payment device feature data associated with each existing payment device of the plurality of existing payment devices, wherein each respective machine learning model of the plurality of machine learning models is associated with a respective transaction metric of the plurality of transaction metrics, wherein, when training the plurality of machine learning models, the at least one processor is configured to:

calculate a loss for each of the plurality of machine learning models based on the plurality of transaction metrics and the transaction data;

update each of the plurality of machine learning models based on a respective loss by adjusting at least one trainable parameter of each of the plurality of machine learning models to provide a plurality of updated machine learning models;

determine whether each of the plurality of updated machine learning models satisfies a threshold level of accuracy; and repeatedly update the plurality of updated machine learning models until the threshold level of accuracy is satisfied, wherein a plurality of trained machine learning models comprises the plurality of updated machine learning models upon determining that the plurality of updated machine learning models satisfies the threshold level of accuracy;

predict a plurality of predicted transaction metrics based on the proposed spending behavior data and the proposed payment device feature data associated with the at least one proposed payment device using the plurality of trained machine learning models;

determine a respective index for each of the plurality of transaction metrics from the plurality of trained machine learning models based on the plurality of predicted transaction metrics for the at least one proposed payment device and the plurality of transaction metrics predicted for the plurality of existing payment devices;

determine a plurality of final predicted transaction metrics based on the respective index for each of the plurality of transaction metrics from the plurality of trained machine learning models and a plurality of actual transaction metrics for the plurality of existing payment devices;

determine, based on an adjustment factor, a range for each final predicted transaction metric of the plurality of final predicted transaction metrics based on the respective index for each of the plurality of transaction metrics from the plurality of trained machine learning models;

determine a feature importance ranking of the plurality of payment device features;

generate at least one communication based on the range for each of the plurality of final predicted transaction metrics and the feature importance ranking; and transmit the at least one communication generated based on the range for each of the plurality of final predicted transaction metrics and the feature importance ranking.

2. The system of claim 1, wherein the at least one processor is further configured to:

determine an average value of the at least one transaction related feature, wherein the at least one predicted transaction metric comprises a percentage change of the at least one transaction related feature relative to the average value of the at least one transaction related feature.

3. The system of claim 1, wherein the plurality of existing payment devices comprises a comparison payment device.

4. The system of claim 3, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

5. The system of claim 1, wherein the spending behavior data comprises demographic data, issuer attribute data, and macroeconomic data.

6. The system of claim 1, wherein the at least one processor is further configured to:

match at least a subset of the plurality of payment device features of each existing payment device with at least a subset of the plurality of payment device features of the at least one proposed payment device, wherein the plurality of existing payment devices are selected based on the matching.

7. A method comprising:

receiving, with at least one processor, spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices;

receiving, with at least one processor, proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device;

training, with at least one processor, a plurality of machine learning models to predict a plurality of transaction metrics associated with the transaction data based on the spending behavior data and the payment device feature data associated with each existing payment device of the plurality of existing payment devices, wherein each respective machine learning model of the plurality of machine learning models is associated with a respective transaction metric of the plurality of transaction metrics, wherein training the plurality of machine learning models comprises:

calculating a loss for each of the plurality of machine learning models based on the plurality of transaction metrics and the transaction data;

updating each of the plurality of machine learning models based on a respective loss by adjusting at least one trainable parameter of each of the plurality of machine learning models to provide a plurality of updated machine learning models;

determining whether each of the plurality of updated machine learning models satisfies a threshold level of accuracy; and repeatedly updating the plurality of updated machine learning models until the threshold level of accuracy is satisfied, wherein a plurality of trained machine learning models comprises the plurality of updated machine learning models upon determining that the plurality of updated machine learning models satisfies the threshold level of accuracy;

predicting, with at least one processor, a plurality of predicted transaction metrics based on the proposed spending behavior data and the proposed payment device feature data associated with the at least one proposed payment device using the plurality of trained machine learning models;

determining, with at least one processor, a respective index for each of the plurality of transaction metrics from the plurality of trained machine learning models based on the plurality of predicted transaction metrics for the at least one proposed payment device and the plurality of transaction metrics predicted for the plurality of existing payment devices;

determining, with at least one processor, a plurality of final predicted transaction metrics based on the respective index for each of the plurality of transaction metrics from the plurality of trained machine learning models and a plurality of actual transaction metrics for the plurality of existing payment devices;

determining, with at least one processor, based on an adjustment factor, a range for each final predicted transaction metric of the plurality of final predicted transaction metrics based on the respective index for each of the plurality of transaction metrics from the plurality of trained machine learning models;

determining, with at least one processor, a feature importance ranking of the plurality of payment device features;

generate at least one communication based on the range for each of the plurality of final predicted transaction metrics and the feature importance ranking; and transmitting, with at least one processor, the at least one communication generated based on the range for each of the plurality of final predicted transaction metrics and the feature importance ranking.

8. The method of claim 7, further comprising:

determining, with at least one processor, an average value of the at least one transaction related feature, wherein the at least one predicted transaction metric comprises a percentage change of the at least one transaction related feature relative to the average value of the at least one transaction related feature.

9. The method of claim 7, wherein the plurality of existing payment devices comprises a comparison payment device, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

10. The method of claim 7, wherein the spending behavior data comprises demographic data, issuer attribute data, and macroeconomic data.

11. The method of claim 7, further comprising:

matching, with at least one processor, at least a subset of the plurality of payment device features of each existing payment device with at least a subset of the plurality of payment device features of the at least one proposed payment device, wherein the plurality of existing payment devices are selected based on the matching.

12. A computer program product, comprising at least one non-transitory computer-readable medium including program instructions that, when executed by at least one processor, cause the at least one processor to:

receive spending behavior data, payment device feature data, and transaction data associated with each existing payment device of a plurality of existing payment devices, the spending behavior data associated with a plurality of spending behavior-related features of a respective group of users for each respective existing payment device of the plurality of existing payment devices, the payment device feature data associated with a plurality of payment device features for each existing payment device of the plurality of existing payment devices, the transaction data associated with at least one transaction related feature of the respective group of users for each respective existing payment device of the plurality of existing payment devices;

receive proposed spending behavior data and proposed payment device feature data associated with at least one proposed payment device, the proposed spending behavior data associated with a plurality of spending behavior-related features of a proposed group of users for the at least one proposed payment device, the proposed payment device feature data associated with a plurality of payment device features for the at least one proposed payment device;

train a plurality of machine learning models to predict a plurality of transaction metrics associated with the transaction data based on the spending behavior data and the payment device feature data associated with each existing payment device of the plurality of existing payment devices, wherein each respective machine learning model of the plurality of machine learning models is associated with a respective transaction metric of the plurality of transaction metrics wherein, the instructions that cause the at least one processor to train the plurality of machine learning models, cause the at least one processor to:

calculate a loss for each of the plurality of machine learning models based on the plurality of transaction metrics and the transaction data;

update each of the plurality of machine learning models based on a respective loss by adjusting at least one trainable parameter of each of the plurality of machine learning models to provide a plurality of updated machine learning models;

determine whether each of the plurality of updated machine learning models satisfies a threshold level of accuracy; and repeatedly update the plurality of updated machine learning models until the threshold level of accuracy is satisfied, wherein a plurality of trained machine learning models comprises the plurality of updated machine learning models upon determining that the plurality of updated machine learning models satisfies the threshold level of accuracy;

predict a plurality of predicted transaction metrics based on the proposed spending behavior data and the proposed payment device feature data associated with the at least one proposed payment device using the plurality of trained machine learning models;

determine a respective index for each of the plurality of transaction metrics from the plurality of trained machine learning models based on the plurality of predicted transaction metrics for the at least one proposed payment device and the plurality of transaction metrics predicted for the plurality of existing payment devices;

determine a plurality of final predicted transaction metrics based on the respective index for each of the plurality of transaction metrics from the plurality of trained machine learning models and a plurality of actual transaction metrics for the plurality of existing payment devices;

determine, based on an adjustment factor, a range for each final predicted transaction metric of the plurality of final predicted transaction metrics based on the respective index for each of the plurality of transaction metrics from the plurality of trained machine learning models;

determine a feature importance ranking of the plurality of payment device features;

generate at least one communication based on the range for each of the plurality of final predicted transaction metrics and the feature importance ranking; and transmit the at least one communication generated based on the range for each of the plurality of final predicted transaction metrics and the feature importance ranking.

13. The computer program product of claim 12, wherein the program instructions, when executed by the at least one processor, further cause the at least one processor to:

determine an average value of the at least one transaction related feature, wherein the at least one predicted transaction metric comprises a percentage change of the at least one transaction related feature relative to the average value of the at least one transaction related feature.

14. The computer program product of claim 12, wherein the plurality of existing payment devices comprises a comparison payment device, wherein the at least one predicted transaction metric is a percentage change of the at least one transaction related feature relative to an actual value of the at least one transaction related feature for the comparison payment device, and wherein the proposed spending behavior data comprises the spending behavior data associated with the comparison payment device.

15. The computer program product of claim 12, wherein the program instructions, when executed by the at least one processor, further cause the at least one processor to:

match at least a subset of the plurality of payment device features of each existing payment device with at least a subset of the plurality of payment device features of the at least one proposed payment device, wherein the plurality of existing payment devices are selected based on the matching.

* * * * *